(12) United States Patent
Merth

(10) Patent No.: US 9,303,662 B2
(45) Date of Patent: Apr. 5, 2016

(54) PUMP FAN CONTROL CIRCUIT AND BLOCK FOR TRUCK MOUNTABLE HYDRAULIC SYSTEM

(71) Applicant: Stac, Inc., St. Paul, MN (US)

(72) Inventor: Jeffrey Mark Merth, Oakdale, MN (US)

(73) Assignee: Stac, Inc., St. Paul, MN (US)

( * ) Notice: Subject to any disclaimer, the term of this patent is extended or adjusted under 35 U.S.C. 154(b) by 328 days.

(21) Appl. No.: 14/141,166

(22) Filed: Dec. 26, 2013

(65) Prior Publication Data

US 2014/0182711 A1 Jul. 3, 2014

Related U.S. Application Data

(60) Provisional application No. 61/746,354, filed on Dec. 27, 2012.

(51) Int. Cl.
  *F15B 21/04* (2006.01)
  *B60P 1/16* (2006.01)
  *F15B 13/08* (2006.01)

(52) U.S. Cl.
  CPC .............. *F15B 21/042* (2013.01); *B60P 1/162* (2013.01); *F15B 13/0814* (2013.01); *F15B 13/0885* (2013.01); *F15B 13/0896* (2013.01); *F15B 2211/50554* (2013.01); *F15B 2211/5158* (2013.01); *F15B 2211/62* (2013.01); *F15B 2211/6343* (2013.01); *F15B 2211/7058* (2013.01); *F15B 2211/75* (2013.01); *Y10T 137/6881* (2015.04)

(58) Field of Classification Search
  CPC ..... F15B 21/042; F15B 2211/62; B60P 1/162
  USPC ................................................... 60/329, 456
  See application file for complete search history.

(56) References Cited

U.S. PATENT DOCUMENTS

| 4,798,050 A | 1/1989 | Nakamura et al. |
| 5,875,630 A | 3/1999 | Walsh et al. |
| 5,946,911 A * | 9/1999 | Buschur et al. ................. 60/424 |
| 6,681,568 B2 * | 1/2004 | Smith ............................. 60/422 |
| 6,848,255 B2 * | 2/2005 | Chiaramonte ................. 60/456 |
| 7,155,907 B2 | 1/2007 | Desjardins et al. |
| 7,913,713 B2 | 3/2011 | Nelson |
| 8,024,926 B2 | 9/2011 | Cheong |

* cited by examiner

*Primary Examiner* — Thomas E Lazo
(74) *Attorney, Agent, or Firm* — Shewchuk IP Services, LLC; Jeffrey D. Shewchuk

(57) ABSTRACT

A hydraulic fan powered in a branch of a vehicle-carried working load hydraulic circuit helps cool hydraulic fluid in a cooler. A switching block has a bypass mode which kicks in whenever sensed hydraulic fluid temperature indicates an overheat condition. The bypass mode shuts off hydraulic fluid to all the working loads of the system, while circulating hydraulic fluid as fast as possible through the cooler and running the cooling fan at a slower rate. After the hydraulic fluid cools below the overheat threshold temperature, a start button must be pressed before the switching block will again power the working loads and run the fan at a higher speed.

15 Claims, 8 Drawing Sheets

PUMP FAN CONTROL CIRCUIT AND BLOCK FOR TRUCK MOUNTABLE HYDRAULIC SYSTEM

CROSS-REFERENCE TO RELATED APPLICATION(S)

The present application claims priority from U.S. Provisional Application No. 61/746,354 entitled PUMP FAN CONTROL CIRCUIT AND BLOCK FOR TRUCK MOUNTABLE HYDRAULIC SYSTEM, filed Dec. 27, 2012, incorporated herein by reference.

BACKGROUND OF THE INVENTION

The present invention relates to hydraulic systems mounted on trucks or similar vehicles to deliver hydraulic fluid, sometimes referred to as wet kit installations, such as used in tractor/trailers or trucks known as end dumps, side dumps, walking floors, tankers, low boys or similar vehicles. An example is shown in U.S. Pat. No. 7,913,713, incorporated by reference.

Common problems of such hydraulic systems are evidenced when the hydraulic fluid overheats, which can be indicative of other root causes of the hydraulic overheating on the tractor/trailer. In response to the overheating problem, some hydraulic systems have temperature switches which sense the temperature of the hydraulic fluid and turn the hydraulic system off if the sensed temperature exceeds a threshold value. By turning the hydraulic system off, often an underlying problem can be identified and corrected before a catastrophic overheating failure occurs. However, inoperability of the hydraulic system due to the overheating shut-off typically occurs at an inopportune time and location.

Hydraulic switching blocks can include one or more pressure relief mechanisms (such as pressure relief valves) that prevent fluid pressure within a portion of the hydraulic circuit from exceeding a threshold pressure value. When the hydraulic circuit powers the cooling fan as well as a working load, a pressure relief valve may be used to reduce the pressure used to drive the cooling fan. When a hydraulic circuit serves more than one device at the same time, the circuit designer may determine that the hydraulic circuit should share the hydraulic fluid on some basis of priority. Depending upon what other working load is being driven, and the cooling fan may or may not be considered a priority usage of the hydraulic fluid.

SUMMARY OF THE INVENTION

The present invention involves the realization that overheating of the hydraulic fluid can occur due to a wide range of underlying causes, not all of which call for or require immediate inoperability of the entire system, and the further realization that by turning the hydraulic system off (such as at the power take-off or PTO) the hydraulic system loses its ability to quickly cool the hydraulic fluid. The present invention thus includes a hydraulic system and block which shuts off pressure to the trailer or other hydraulically operated equipment when hydraulic fluid overheats, but which continues circulation of the hydraulic fluid through the cooler and continues use of the hydraulic fluid to run the cooling fan. The block includes all the switching components of the system for easy mounting on a truck. In another aspect, the cooling fan is run at a lower rate after the overheat threshold is surpassed, and oil circulates faster through the cooler.

Figure 1:
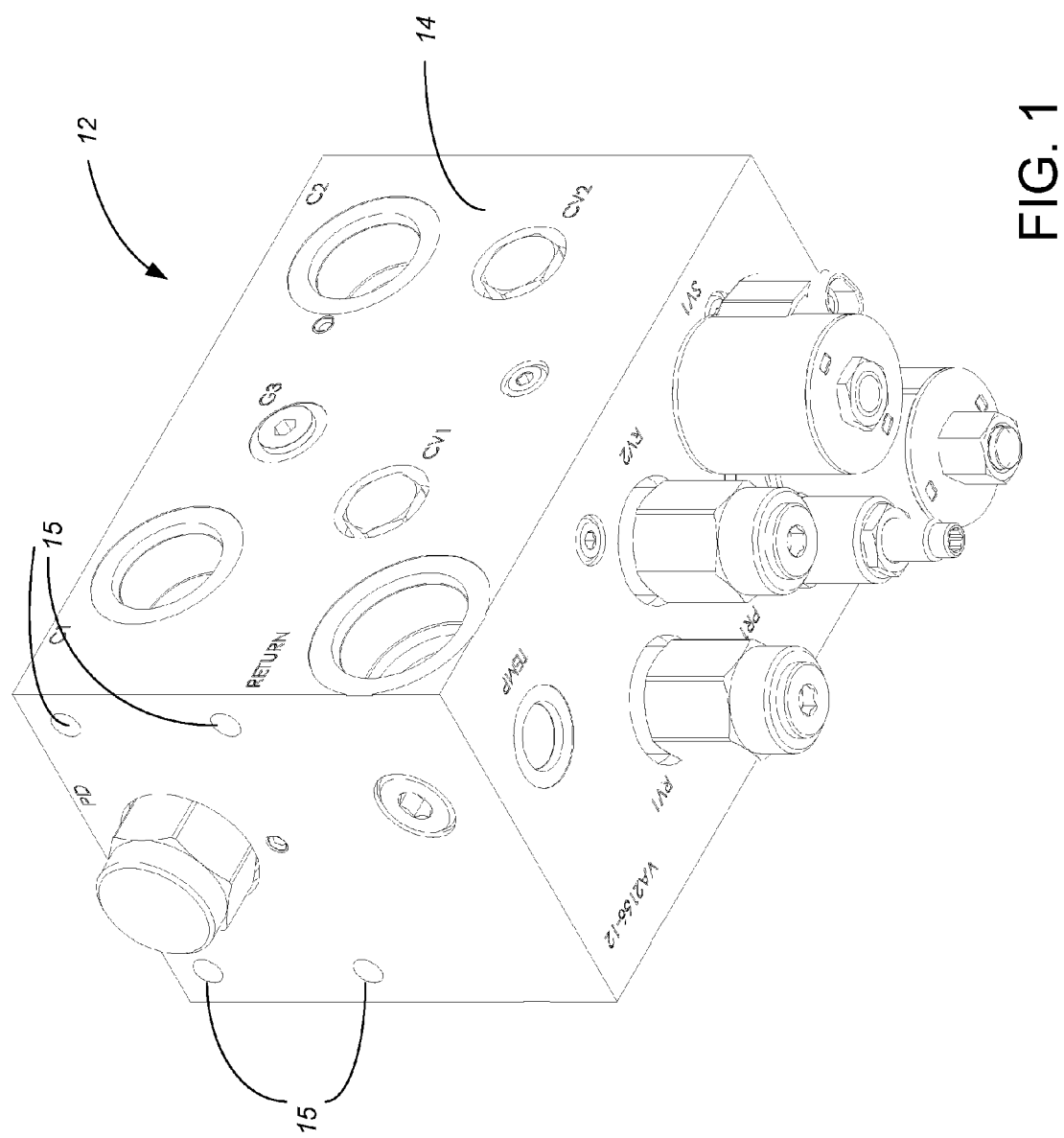
FIG. 1 is a first perspective (isometric) view of the hydraulic switching block of a preferred embodiment of the present invention, shown from the bottom to better see the various attached components.
Figure 2:
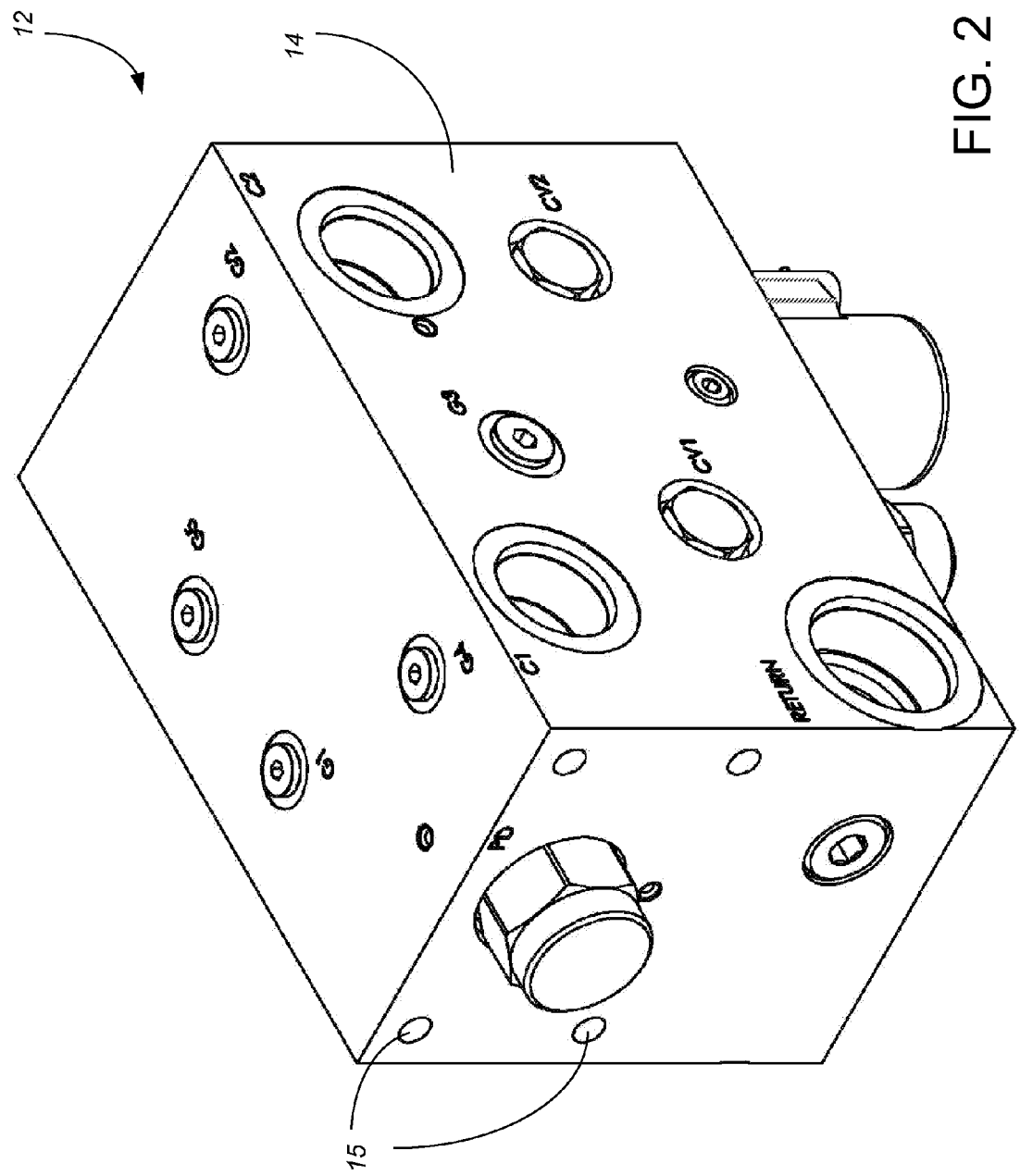
FIG. 2 is a second perspective (isometric) view of the hydraulic switching block of FIG. 1, shown from the top.
Figure 5:
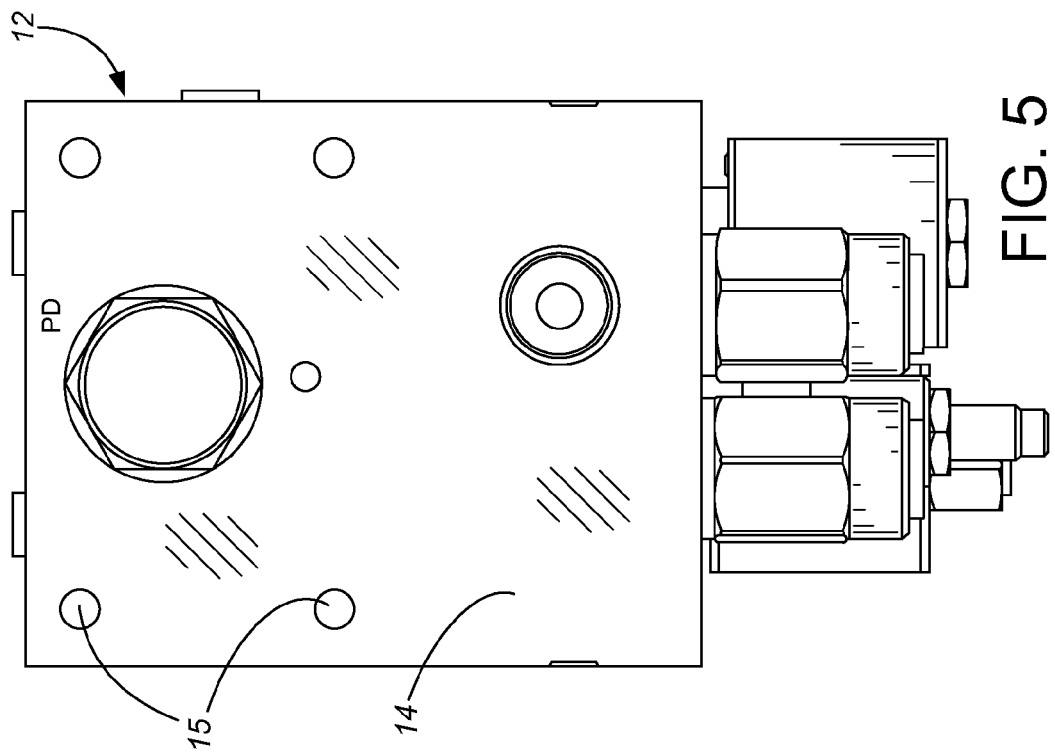
FIG. 5 is a front view of the hydraulic switching block of FIGS. 1-4.
Figure 3:
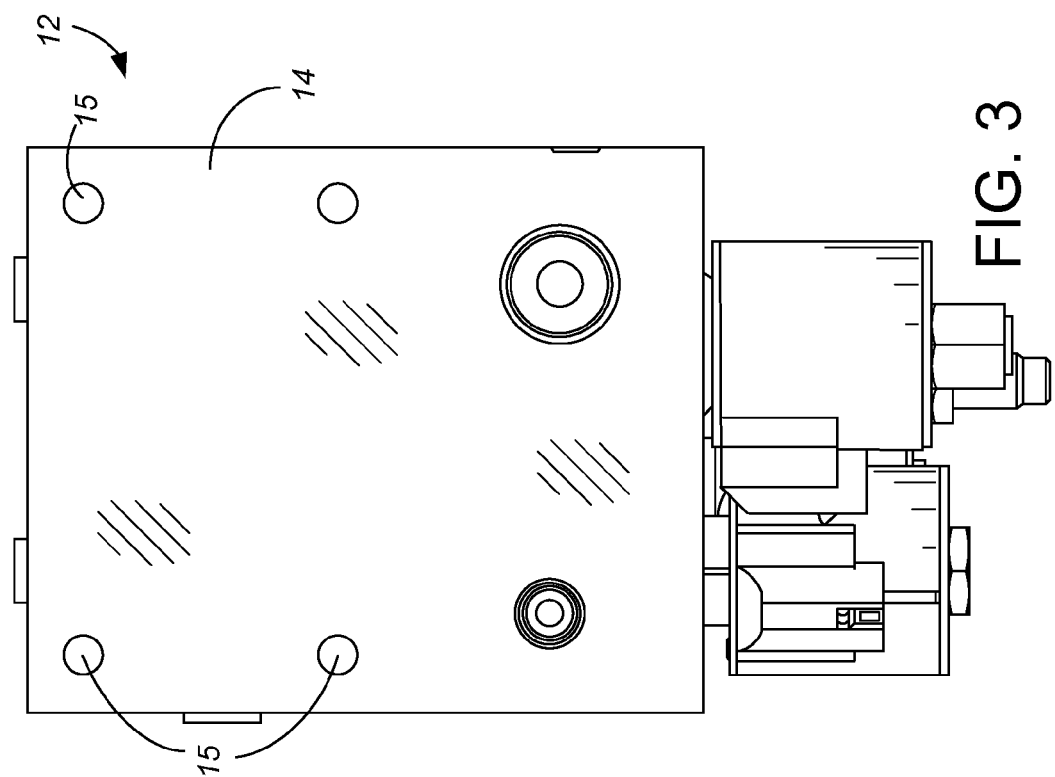
FIG. 3 is a rear view of the hydraulic switching block of FIGS. 1 and 2.
Figure 4:
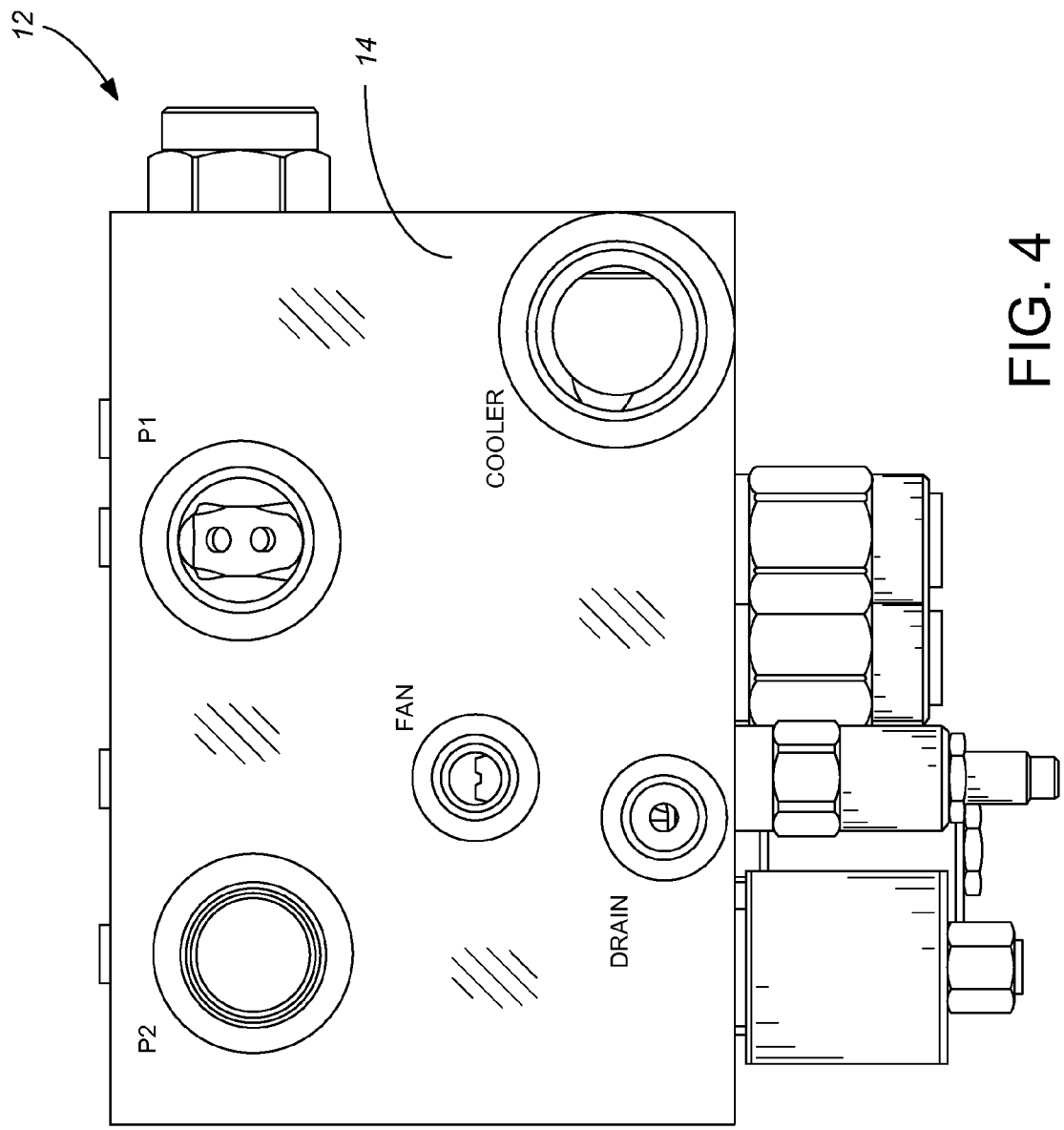
FIG. 4 is a right side view of the hydraulic switching block of FIGS. 1-3.
Figure 6:
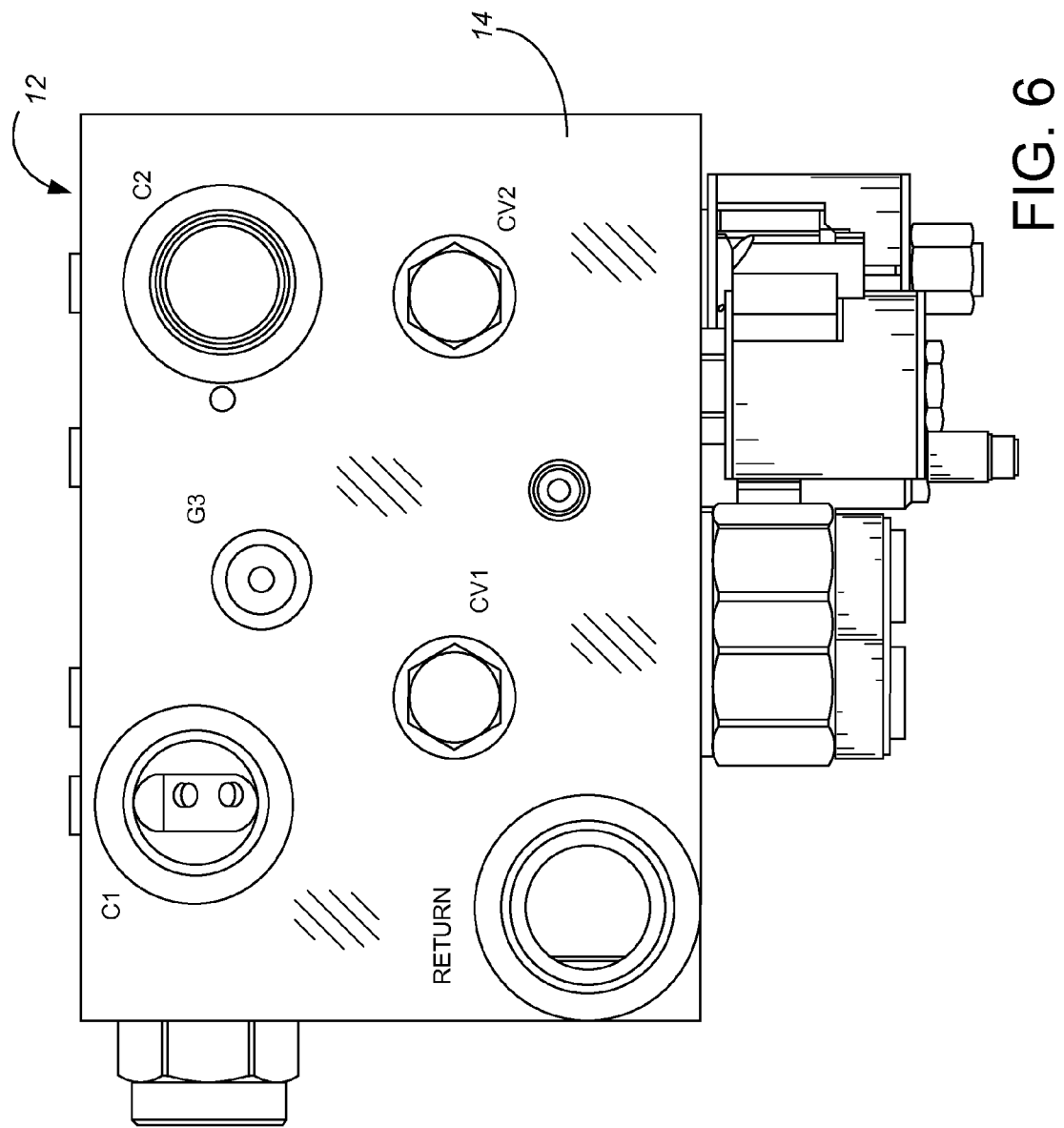
FIG. 6 is a left side view of the hydraulic switching block of FIGS. 1-5.
Figure 7:
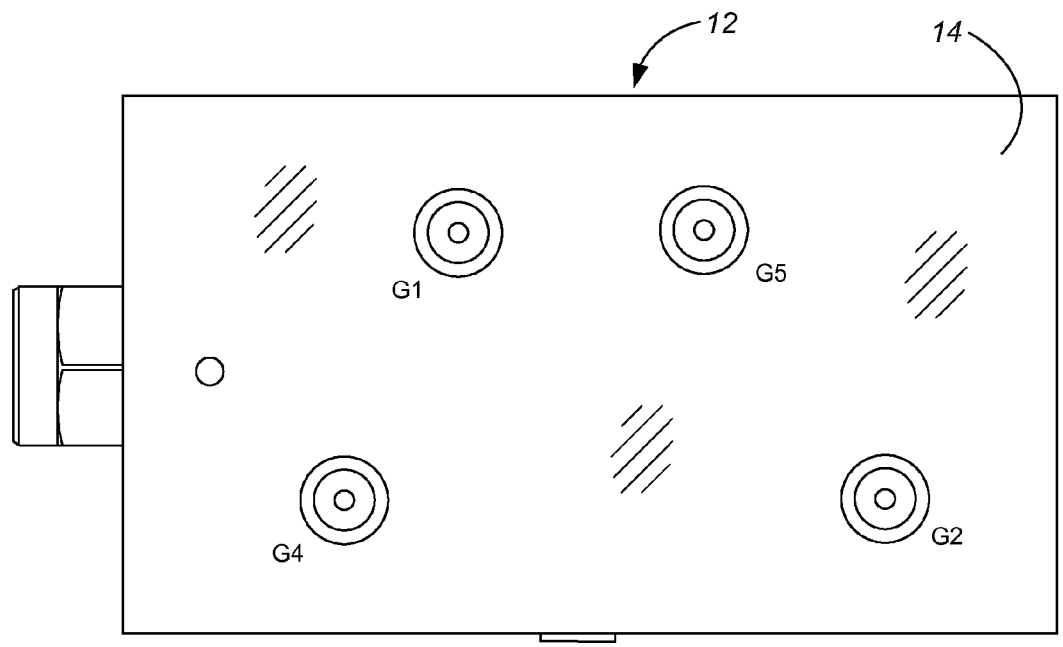
FIG. 7 is a top plan view of the hydraulic switching block of FIGS. 1-6.
Figure 8:
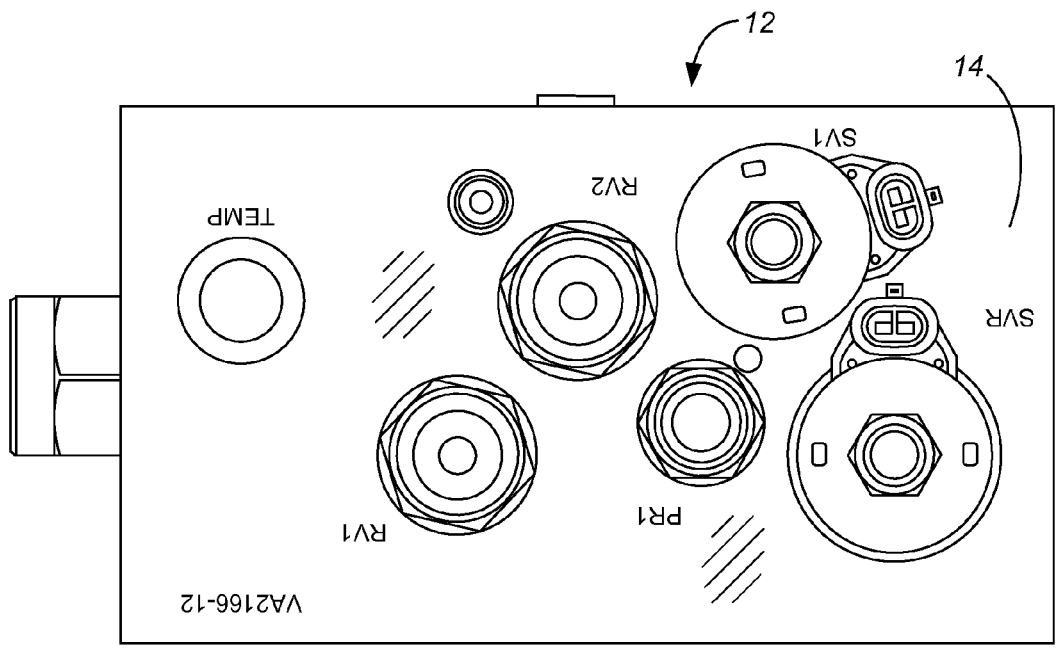
FIG. 8 is a bottom plan view of the hydraulic switching block of FIGS. 1-7.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention. The labels "rear", "right", "front", "left", "top" and "bottom" are merely for reference, as the orientation in which the hydraulic switching block is mounted is not significant to the operation of the invention.

DETAILED DESCRIPTION

The preferred embodiment of the invention involves a hydraulic system 10 (shown in full in FIG. 9) executed through a switching block 12 which is mounted on the tractor (not shown) of a tractor-trailer rig (not shown). In the preferred embodiment, the block 14 of the switching block 12 is machined out of 6061 T6 aluminum and anodized gold, but it could be equivalently made out of numerous materials. The aluminum material is lightweight, easy to machine, corrosion-resistive, and cost effective for planned quantities. The various valves, plugs etc. depicted are attached to the block 14, typically via threaded connections to their respective openings. In the preferred embodiment, labels on the block 14 designate which valve, plug and port on the block 14 is which. The preferred block 14 is about 8¾×5×6 inches. Mounting holes 15 may also be present on the block 14. A wide variety of other shapes and sizes of blocks could alternatively be used, as appropriate for any specific valves and port sizes.

The block 14 includes two high pressure inlet ports P1 and P2, for connection to first and second pumps 16, 18 (shown in FIG. 9) driven by a PTO 20 off the engine 22 of the vehicle (not shown). The preferred port sizes are shown on hydraulic schematic, and in the preferred embodiment high pressure inlet ports P1 and P2 are size 16T ports.

In the preferred embodiment, each pump 16, 18 is rated to provide up to 30 gallons per minute, at a hydraulic pressure up to about 2900 psi. In use, the flow rate output of each pump 16, 18 is a function of back pressure on the circuit and engine speed, with higher flow rate outputs at lower back pressures and higher engine speeds. The primary purpose of the hydraulic system 10 is to provide hydraulic power to two different trailer circuits 24, 26 (shown in part at the top of the hydraulic schematic of FIG. 9) each via a working load valve 28, 30), thereby each powering a working load 32, 34 on the trailer such as a hydraulic cylinder (not separately shown) for dumping or for movement of a boom (not shown) or for similar known working hydraulic uses. While the preferred embodiment has the same rated pump flow rate and pressure for each pump 16, 18, pumps rated for other pressures and other pump flow rates could be used, including different values for the two different pumps/hydraulic circuits.

Figure 9:
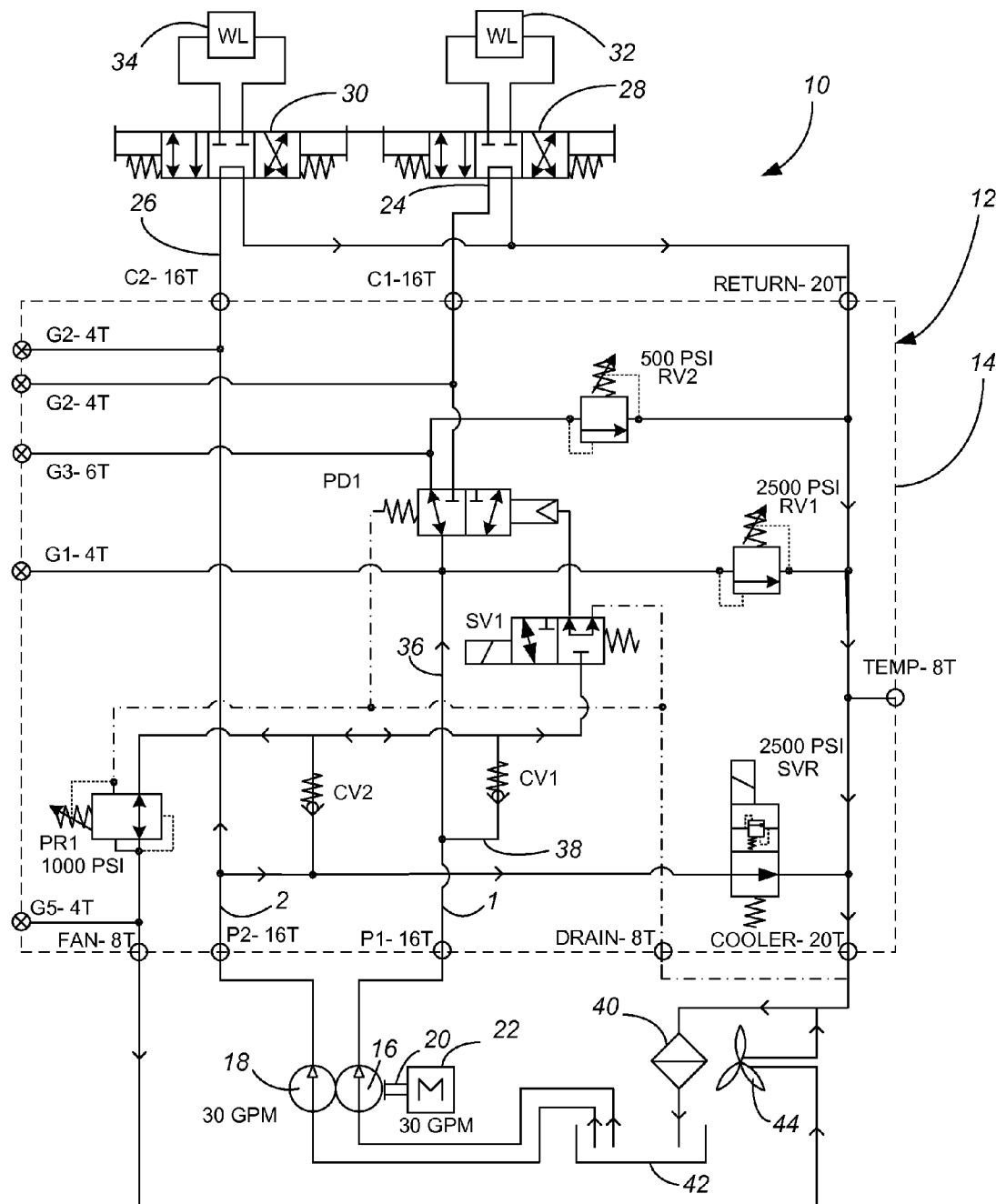
FIG. 9 is a hydraulic schematic for the preferred switching block and hydraulic system.

The hydraulic circuit 10 shown is depicted in FIG. 9 in its normal or unenergized position, which is a bypass mode. On circuit 1 in bypass mode, oil travels through two branches 36, 38 of the circuit 1. In one branch 36, oil flows through piloted directional valve PD-1 (#16 piloted 2 position, 3 way ext vent 70 psi valve, PD16-S50-0-N-70; all the listed valves can be commercially obtained from Hydraforce, Inc. of Lincolnshire, Ill.) and then through the 500 psi return valve RV2 (relief PO spool 500 psi valve, RV12-26H-0-N-15-05) to output port Cooler, to be piped exteriorly of the switching block 12 back to the oil cooler 40 and tank 42. The 500 psi value for return valve RV2 is preferably screw adjustable to any pressure within a range, such as to a value within the range of 500 to 800 psi.

In a second branch 38 of circuit 1, oil flows through check valve CV1 (#08 check valve, 4 psi, CV08-20-0-N-4) and the 1000 psi Pressure Reduction valve PR1 (#10 pres reduce/relieve P.O. 1000 psi, PR10-36A-0-N-15/10.00) to output port Fan, to be piped exteriorly to the switching block 12 back to drive the cooling fan 44 and then through the cooler 40 and back to the tank 42. Thus, the screw adjustment of return valve RV2 controls the fan speed while the switching block 12 is in its by-pass mode, to a lower speed than when the switching block 12 is in operational mode, but the fan 44 still operates. While the fan 44 is operating at this low speed, circuit 1 directs an essentially full flow, driven by pump 16 against a back pressure of only about 500 psi, through either the pressure reduction valve RV2 or the fan 44 and through the cooler 40.

On circuit 2 during bypass mode, oil flows immediately through the normally open solenoid valve SVR (#12 solenoid operated relief, 2500 psi, SVRV12-26F-0-N-00/25.00 using a #10 e-coil, 12 VDC, metri-pack, zener solenoid, 4303912) for return to the Cooler port. Additionally, oil can flow through the Circuit 2 output port C2, through circuit 2 trailer valve and back to the Return port, and then through the switching block 12 back to the Cooler port, cooler 40 and tank 42. While the fan 44 is operating at low speed, circuit 2 directs a completely full flow, driven by pump 18 against almost no back pressure other than piping loss, through either the solenoid valve SVR or the circuit 2 trailer valve and through the cooler 40. In sum, during the normal bypass mode, the cooling fan 44 is driven at about half speed, and the oil in both circuits is cooled by a high flow rate through the cooler 40.

Figure 10:
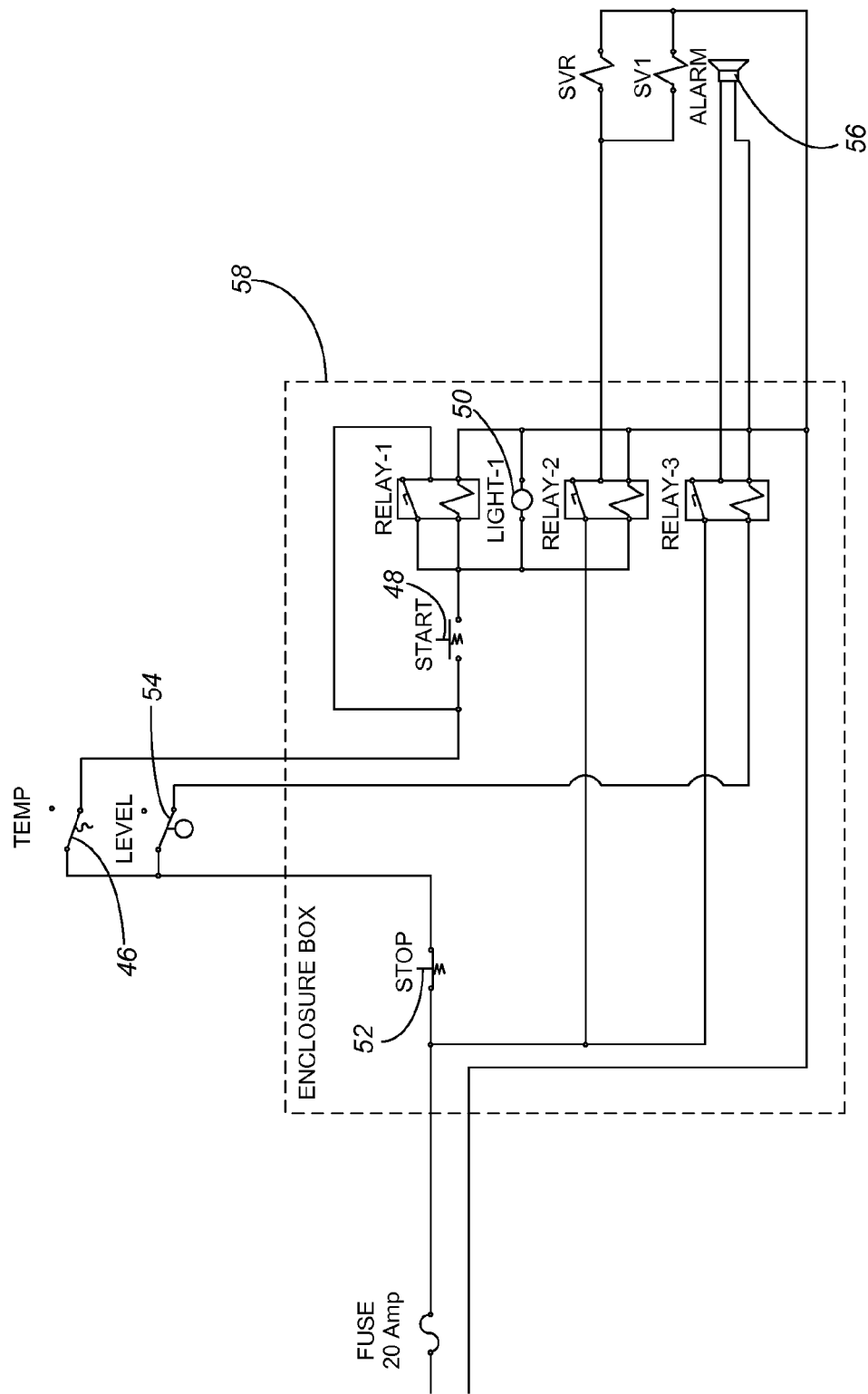
FIG. 10 is an electrical schematic for the preferred system.

The switching block 12 stays in bypass mode any time the oil temperature sensor 46 (shown in FIG. 10) senses oil temperature above a threshold value, i.e., during all overheat conditions. When the oil is within a standard operating temperature range, an electrical signal can be provided to the electrical circuit to drive both the solenoid valve SV1 (for the first oil circuit, SV10-33-0-N-00) and solenoid valve return SVR (for the second oil circuit) to their other position. For instance, the electrical circuit of FIG. 10 operates in this way, i.e., so long as the oil temperature is below a threshold value so the temp switch 46 is closed, pressing the "start" button 48 will turn on the light 50, close both relay-1 and relay-2, and power SVR and SV1. Pressing the "stop" button 52 at any time will return the system 10 to bypass mode.

Referring back to the hydraulic schematic of FIG. 9, when SV1 is energized, SV1 directs oil to switch the piloted directional valve PD-1 to its other position. Circuit 1 now has a primary branch which flows from port P1, through piloted directional valve PD1 to circuit port C1 and to the circuit 1 trailer valve to power the first circuit 24 on the trailer as necessary. Return valve RV1 (relief PO spool 2500 psi valve, RV12-26H-0-N-35/25) has a screw adjustment, such as within a range of 1000-3500 psi and in this case shown at 2500 psi, for limiting the pressure through the first circuit. In the second branch of circuit 1, oil flows through check valve CV1 to not only power the piloted directional valve PD1, but also through the 1000 psi Pressure Return valve PR1 to drive the fan 44 at full speed.

In circuit 2, the other position of solenoid valve return SVR has a screw adjustment, such as within a range of 1000-3000 psi, in this case shown at 2500 psi for limiting the pressure in circuit 2. When SVR is energized, this 2500 psi pressure is primarily directed to the circuit 2 trailer valve 30. Oil can also flow through check valve CV2 and through the 1000 psi pressure return valve PR1 to drive the fan 44. Note that if both the working power valve (circuit 1 trailer valve 28 and the circuit 2 trailer valve 30) are in the rest position shown in FIG. 9, the pressure on the circuit may decline below 1000 psi with full oil flow through the trailer valves 28, 30. That is, full speed running of the cooling fan 44 is only assured when a) the temperature of the hydraulic fluid remains below the threshold value; and b) either circuit 1 working load 32 or circuit 2 working load 34 presents enough resistance to raise pressure above 1000 psi.

All of the ports G1, G2, G3, G4 and G5 are simply machining ports used for most easily forming the block 14, and are plugged during normal usage. Temperature port TEMP is also typically plugged, but can be used if desired for a switching block temperature gauge 46 or similar purpose.

The system 10 includes a temperature sensor 46, in the temperature port TEMP or elsewhere in the hydraulic system 10, which senses the temperature of the hydraulic fluid. Whenever an overheat event occurs, the switching block 12 returns to bypass mode, still driving the fan 44 (at low speed) and circulating oil at a very high flowrate (through circuit 1 against a back pressure of 500 psi as controlled by return valve RV2) through the cooler 40 rather than turning off the PTO 20. In testing of one preferred embodiment, oil exceeded a threshold temperature of about 175° F., kicking the switching block 12 into bypass mode. In bypass mode the oil cooled from 177° F. to about 130° F. in about 5 minutes, much faster than if the PTO 20 had been fully shut down due to the overheat condition. This cool down is also believed to be faster than if the oil had been used to drive the fan 44 at full speed and the commensurately slower flow rate (through circuit 1 against a back pressure of 1000 psi as controlled by pressure reduction valve PR1).

In one alternative or additional embodiment of the system as shown in the electrical schematic, an oil level gauge 54 can set off a different alarm 56 and shut down sequence than the bypass sequence initiated by temperature sensor 46. For instance, a low oil condition can first shut off the cruise control (not shown) of the trailer, and then smoothly stop the PTO 20.

The electrical circuit shown is primarily embodied in an electrical enclosure box 58 which is mounted in the vicinity of the cooler 40. In this embodiment, both initial starting and recovery from an overheat condition require a manual pressing of the start button 48. Requiring the start button 48 to be pressed to exit an overheat event after cool down ensures ensuring that merely returning to operational temperature (without pressing the start button 48) does not restart either of the trailer circuits 24, 26 and their working loads 32, 34 (such as power cylinders on the trailer) at an inopportune or dangerous time.

Although the present invention has been described with reference to preferred embodiments, workers skilled in the art will recognize that changes may be made in form and detail without departing from the spirit and scope of the invention. As a particular example, all the specified pressure values detailed herein are merely exemplary of a preferred embodiment, and can be changed or adjusted for a particular use. The important considerations are that an overheating condition result in shutting off hydraulic fluid flow to the trailer circuits 24, 26 and their working loads 32, 34, but leave the PTO 20 running to circulate hydraulic fluid through the cooler 40, and also using the hydraulic fluid to power the fan 44 at a speed which is selected (by the circuit designer and/or adjustment) to be different from the full speed fan rate selected (by the circuit designer and/or adjustment) for cooling during normal working load operation.

What is claimed is:

1. A switching block for a vehicle carried hydraulic circuit comprising:
   a block comprising:
      a high pressure input port for receiving high pressure input of hydraulic fluid;
      a high pressure output port for outputting high pressure hydraulic fluid flow to a working load, the high pressure output port being fluidly connected via a high pressure flow channel through the block to the high pressure input port;
      a fan pressure outlet port for outputting fan pressure hydraulic fluid flow to a hydraulically powered cooling fan for the hydraulic fluid, the fan pressure outlet port being fluidly connected through the block to the high pressure flow channel;
   a directional valve housed in the block in the high pressure flow channel, the directional valve having a first position wherein the high pressure flow is open therethrough to the high pressure output port, the directional valve having a second position wherein high pressure flow is closed to the high pressure output port, the directional valve being controllable at least in part based upon temperature of the hydraulic fluid so as to be open only as long as temperature of the hydraulic fluid remains below a bypass value;
   a working fan pressure reduction valve housed in the block between the high pressure flow channel and the fan pressure outlet port, the working fan pressure reduction valve operating so as to reduce pressure from the high pressure flow channel to a lower working fan pressure while the directional valve is providing high pressure hydraulic fluid flow to the high pressure output port, the working fan pressure being suitable for powering the cooling fan at high speed; and
   a bypass fan pressure reduction valve housed in the block in fluid communication with the high pressure flow channel when the directional valve is not open, the bypass fan pressure reduction valve operating so as to reduce pressure from the high pressure flow channel to a lower bypass fan pressure when the directional valve is not providing high pressure hydraulic fluid flow to the high pressure output port, the bypass fan pressure also being lower than the working fan pressure and being suitable for powering the cooling fan at low speed.

2. The switching block of claim 1, further comprising:
   a temperature sensor which senses hydraulic fluid temperature within the block, the temperature sensor controlling the directional valve at least in part based upon temperature of the hydraulic fluid so the directional valve is open only as long as temperature of the hydraulic fluid remains below the bypass value.

3. The switching block of claim 2, wherein the block comprises:
   a return inlet port for receiving hydraulic fluid flow from the working load; and
   a return output port for outputting return hydraulic fluid flow, the return pressure output port being fluidly connected via a return pressure flow channel through the block to the return input port;
wherein the temperature sensor is in direct fluid communication with the return pressure flow channel; and
wherein flow through the bypass fan pressure reduction valve is into the return pressure flow channel.

4. The switching block of claim 1, further comprising:
   a solenoid-operated pilot valve housed in the block, the solenoid-operated pilot valve controlling position of the directional valve.

5. The switching block of claim 1, comprising multiple high pressure flow channels through the block each for outputting high pressure hydraulic fluid flow to a separate working load.

6. The switching block of claim 5, further comprising:
   a check valve housed in the block for each of the multiple high pressure flow channels, each check valve being in fluid communication between its high pressure flow channel and a fan flow channel, the fan flow channel leading to the working fan pressure reduction valve.

7. The switching block of claim 5, wherein the block comprises:
   a return inlet port for receiving hydraulic fluid flow from the working load; and
   a return output port for outputting return hydraulic fluid flow, the return pressure output port being fluidly connected via a return pressure flow channel through the block to the return input port;
the switching block further comprising:
   a solenoid valve return in fluid communication between one of the high pressure flow channels and the return pressure flow channel, the solenoid valve return maintaining pressure in its high pressure flow channel below a maximum high pressure value.

8. The switching block of claim 1, wherein the bypass fan pressure reduction valve is adjustable to provide bypass fan pressure which is selectable within a range, wherein the range is completely lower than the working fan pressure.

9. A vehicle carried hydraulic circuit comprising:
   a PTO driven by the vehicle engine providing high pressure hydraulic fluid flow to a high pressure flow channel;
   a working load drivable via high pressure hydraulic fluid flow through the high pressure flow channel;
   a temperature sensor sensing temperature of the hydraulic fluid;
   a directional valve in the high pressure flow channel, the directional valve having a first position wherein high pressure flow is open therethrough to the working load, the directional valve having a second position wherein high pressure flow is closed to the working load, the directional valve being controllable at least in part based upon a signal from the temperature sensor so as to be open only as long as temperature of the hydraulic fluid remains below a bypass value;

a cooler for the hydraulic fluid;

a hydraulically powered cooling fan which blows air for the cooler;

a working fan pressure reduction valve between the high pressure flow channel and the hydraulically powered cooling fan, the working fan pressure reduction valve operating so as to reduce pressure from the high pressure flow channel to a lower working fan pressure while the directional valve is providing high pressure hydraulic fluid flow to the working load, the working fan pressure powering the cooling fan at high speed; and a bypass fan pressure reduction valve in fluid communication with the high pressure flow channel when the directional valve is not open, the bypass fan pressure reduction valve operating so as to reduce pressure from the high pressure flow channel to a lower bypass fan pressure when the directional valve is not providing high pressure hydraulic fluid flow to the working load, the bypass fan pressure also being lower than the working fan pressure and powering the cooling fan at low speed;

the vehicle carried hydraulic circuit thus having a normal bypass mode which continues to drive the cooling fan and circulate hydraulic fluid through the cooler during an overheat condition when sensed hydraulic fluid temperature is above the bypass value, without shutting off the PTO.

10. The vehicle carried hydraulic circuit of claim 9, wherein the temperature sensor is electrical, and wherein the directional valve is controlled at least in part by an electrical solenoid.

11. The vehicle carried hydraulic circuit of claim 10, further comprising:
   a stop control button; and
   a start control button;
wherein pressing the stop control button causes the electrical solenoid to position the directional valve in the second position; and
wherein, after either an overheating event or pressing of the stop control button has caused the electrical solenoid to position the directional valve in the second position, the electrical solenoid cannot move the directional valve to the first position unless both the temperature sensor senses a hydraulic fluid temperature below the bypass value and the start control button is being pressed.

12. The vehicle carried hydraulic circuit of claim 11, further comprising:
   a status light to alert the operator when the directional valve is in the second position either due to an overheating event or pressing of the stop button.

13. The vehicle carried hydraulic circuit of claim 10, further comprising:
   a hydraulic fluid level sensor; and
   an alarm which alerts the operator when hydraulic fluid level has dropped below a threshold value.

14. A switching block for a vehicle carried hydraulic circuit comprising:
   a block comprising:
      a first high pressure input port for receiving high pressure input of hydraulic fluid a first high pressure circuit;
      a first high pressure output port for outputting high pressure hydraulic fluid flow to a first working load, the first high pressure output port being fluidly connected via a first circuit high pressure flow channel through the block to the first high pressure input port;
      a second high pressure input port for receiving high pressure input of hydraulic fluid a second high pressure circuit;
      a second high pressure output port for outputting high pressure hydraulic fluid flow to a second working load, the second high pressure output port being fluidly connected via a second circuit high pressure flow channel through the block to the first high pressure input port;
      a fan pressure outlet port for outputting fan pressure hydraulic fluid flow to a hydraulically powered cooling fan for the hydraulic fluid, the fan pressure outlet port being fluidly connected through the block to both the first high pressure flow channel and the second high pressure flow channel;
   a directional valve housed in the block in the first circuit high pressure flow channel, the directional valve having a first position wherein the high pressure flow is open therethrough to the first high pressure output port, the directional valve having a second position wherein high pressure flow is closed to the first high pressure output port, the directional valve being controllable at least in part based upon temperature of the hydraulic fluid so as to be open only as long as temperature of the hydraulic fluid remains below a bypass value;
   a working fan pressure reduction valve housed in the block between the fan pressure outlet port and both the first circuit high pressure flow channel and the second circuit high pressure flow channel, the working fan pressure reduction valve operating so as to reduce pressure a lower working fan pressure while the directional valve is providing high pressure hydraulic fluid flow to the high circuit pressure output port, the working fan pressure being suitable for powering the cooling fan at a working speed; and
   a bypass fan pressure reduction valve housed in the block in fluid communication with the first circuit high pressure flow channel when the directional valve is not open, the bypass fan pressure reduction valve operating so as to reduce pressure to a lower bypass fan pressure when the directional valve is not providing high pressure hydraulic fluid flow to the first circuit high pressure output port, the bypass fan pressure being different than the working fan pressure and being suitable for powering the cooling fan at a bypass speed which is different than the working speed.

15. The switching block of claim 14, wherein the bypass fan pressure determined by the bypass fan pressure reduction valve is lower than the working fan pressure determined by the working fan pressure reduction valve.

* * * * *